United States Patent

Tominaga et al.

Patent Number: 5,866,657
Date of Patent: Feb. 2, 1999

[54] PRIMER COMPOSITION

[75] Inventors: Yukio Tominaga; Atsuko Tsuchida; Hiroyuki Shiraki, all of Osaka, Japan

[73] Assignee: Takeda Chemical Industries, Ltd., Osaka, Japan

[21] Appl. No.: 970,587

[22] Filed: Nov. 14, 1997

[30] Foreign Application Priority Data

Nov. 18, 1996 [JP] Japan ..................... 8-306639

[51] Int. Cl.$^6$ ....................................... C08F 8/30
[52] U.S. Cl. ............... 525/123; 528/76; 528/79; 525/125; 525/126; 525/452; 525/538; 525/902; 524/366; 524/801; 524/804; 524/806; 524/839; 524/860
[58] Field of Search ............ 528/76, 79; 525/123, 525/125, 126, 452, 538, 902; 524/801, 804, 806, 839, 860, 366

[56] References Cited

U.S. PATENT DOCUMENTS 3,779,794  12/1973  De Santis ................... 117/72

FOREIGN PATENT DOCUMENTS 0 238 013 A1  9/1987  European Pat. Off. .
0 520 390 A1  12/1992  European Pat. Off. .

OTHER PUBLICATIONS

Abstact of Japanese Patent Laid–open Publication No. 03–006274, Date of Publication: Jan. 11, 1991.
Patent Abstracts of Japan, Publication No. 06329925 A, Date of Publication: Nov. 29, 1994.
Abstract of Japanese Patent Laid–open Publication No. 3–6274 A, Date of Publication: Jan. 11, 1991.

*Primary Examiner*—Samuel A. Acquah
*Attorney, Agent, or Firm*—Kubovcik & Kubovcik

[57] ABSTRACT

In order to provide a general-purpose aqueous primer composition requiring no organic solvent and capable of improving adhesive strength and durability while ensuring an adequate application life required for the work of primer coating process, a primer composition according to the present invention contains (a) a modified polyisocyanate obtained by reaction of polyisocyanate; an emulsifying agent having an active hydrogen group reactable to an isocyanate group; and a silane coupling agent having an active hydrogen group reactable to an isocyanate group and (b) a core shell emulsion having a core layer of a rubbery polymer and a shell layer of a glassy polymer and having an active hydrogen group reactable to an isocyanate group in the core layer and/or the shell layer.

6 Claims, No Drawings

PRIMER COMPOSITION

BACKGROUND OF THE INVENTION

1. Field of the Invention

The present invention relates to a primer composition and, more particularly, to a primer composition for use in a priming process applied when an adhesive such as a sealant and adherends such as concrete, woods, metals, plastics and others are adhesive bonded together.

2. Description of the Prior Art

When an adhesive such as a sealant used mainly for building constructions is filled into joints of adherends including concrete, woods, metals and plastics, the priming process is often applied to the adherend, for the purpose of increasing adhesive strength and adhesive durability.

A primer composition usable for the purpose of this kind is disclosed in, for example, Japanese Laid-Open Patent Publication No. Hei 3(1991)-6274, which discloses a primer composition comprising a reactant of a trimer of isophorone diisocyanate with an active-hydrogen-group-containing resin; a silane coupling agent; and a curing-catalyst-containing organic solvent solution. Also, Japanese Laid-Open Patent Publication No. Hei 6(1994)-329925 discloses a primer composition comprising polyisocyanate modified by mercapto silane having an alkoxy group; polyisocyanate having one or more isocyanurate rings and two or more isocyanate groups; at least one of alkoxy silane and γ-chloropropyl trimethoxy silane; and chlorinated polymer dissolved in an inert organic solvent.

However, any of these known primer compositions contain an organic solvent. An aqueous primer composition containing no organic solvent for purposes of this kind has not been known so far.

On the other hand, from the viewpoints of global environment, safety, hygiene and the like, reduction of the amount of use of the organic solvent has recently come to be urgently necessary, for the reason of which development of an aqueous primer composition has been being strongly desired for a primer composition for use in the priming process for the adhesive such as a sealant.

SUMMARY OF THE INVENTION

Accordingly, it is an object of the present invention to provide an aqueous primer composition requiring no organic solvent and capable of improving adhesive strength and durability while ensuring an adequate application life required for the work of primer coating process.

The present invention is directed to a primer composition comprising (a) a modified polyisocyanate obtained by reaction of polyisocyanate; an emulsifying agent having an active hydrogen group reactable to an isocyanate group; and a silane coupling agent having an active hydrogen group reactable to an isocyanate group and (b) a core shell emulsion having a core layer of a rubbery polymer and a shell layer of a glassy polymer and having an active hydrogen group reactable to an isocyanate group in the core layer and/or the shell layer.

Preferably, the core shell emulsion (b) has the active hydrogen group in the core layer. Also, it is preferable that a glass transition temperature (Tg) of the rubbery polymer of the core layer of the core shell emulsion (b) is not more than 20° C. and a glass transition temperature (Tg) of the glassy polymer of the shell layer of the core shell emulsion (b) is not less than 80° C.

Additionally, it is desirable that the polyisocyanate in the modified polyisocyanate (a) is an isocyanurate group containing polyisocyanate containing an isocyanurate group using 1,6-diisocyanato hexane as a base. Desirably, the emulsifying agent is polyoxyethylene alkyl ether and/or polyoxyethylene alkylaryl ether. Further, it is preferable that the silane coupling agent is a mercapto silane base silane coupling agent.

DETAILED DESCRIPTION OF THE PREFERRED EMBODIMENT

In the primer composition according to the present invention, a modified polyisocyanate (a) is a reaction product produced by reaction of an active hydrogen group reactable to an isocyanate group of an emulsifying agent and an active hydrogen group reactable to an isocyanate group of a silane coupling agent with an isocyanate group of a polyisocyanate in a prescribed proportion.

Polyisocyanates of the present invention mainly include diisocyanate of aliphatic and/or alicyclic and polyisocyanate containing derivative with the diisocyanate of aliphatic and/or alicyclic as the base. Preferably, the polyisocyanates employed include isocyanurate group containing polyisocyanate containing an isocyanurate group using 1,6-diisocyanato-hexane (hereinafter it is referred to as HDI) and/or 1-isocyanato-3,3,5-trimethyl-5-isocyanatomethyl-cyclohexane (hereinafter it is referred to as IPDI) as the base; uretdion group containing polyisocyanate containing an uretdion group using HDI and/or IPDI as the base; allophanate group containing polyisocyanate containing an allophanate group using HDI and/or IPDI as the base; biuret group containing polyisocyanate containing a biuret group using HDI and/or IPDI as the base; and oxadiazinetrion group containing polyisocyanate containing an oxadiazinetrion group using HDI and/or IPDI as the base. These derivative-containing polyisocyanate may include two or more kinds of derivatives, and two or more kinds of such derivatives-containing polyisocyanates may be employed together, and further preferable among them may be the isocyanurate group containing polyisocyanate containing the isocyanurate group using HDI as the base. Also, it is preferable that the isocyanate content is in the range of about 10% by weight to about 40% by weight.

The emulsifying agents having the active hydrogen group reactable to the isocyanate group of the polyisocyanate include, for example, nonionic emulsifiers having a hydroxyl group or a mercapto group as the active hydrogen group reactable to the isocyanate group. Preferable among them is a polyoxyethylene base emulsifying agent having the hydroxyl group. Examples of these emulsifying agents are polyoxyethylene alkyl ethers including polyoxyethylene monomethyl ether, polyoxyethylene monolauryl ether and polyoxyethylene monooleyl ether; polyoxyethylene alkylaryl ethers including polyoxyethylene monooctylphenyl ether and polyoxyethylene monononylphenyl ether; and polyoxyethylene sorbitan fatty acid esters including polyoxyethylene sorbitan monolaurate and polyoxyethylene sorbitan monostearate.

These emulsifying agents may be employed alone or in combination with two or more kinds, and preferable among them are polyoxyethylene alkyl ether and/or polyoxyethylene alkyl aryl ether.

Preferably, the polyisocyanate is allowed to react with the emulsifying agent with the equivalent ratio of 0.010–0.034 of the active hydrogen group of the emulsifying agent per 1.00 of an isocyanate group in the polyisocyanate. With the equivalent ratio less than 0.010 of the active hydrogen group of the emulsifying agent per 1.00 of the isocyanate group, insufficient emulsification may be caused in some instances. On the other hand, with the equivalent ratio more than 0.034 of the active-hydrogen group of the emulsifying agent per 1.00 of the isocyanate group, hydrophilic nature may increase excessively to cause deterioration of the properties including water resistance.

The silane coupling agents having the active hydrogen group reactable to the isocyanate group of the polyisocyanate include, for example, silane coupling agents having a mercapto group, an amino group as the active hydrogen group reactable to the isocyanate group. Examples of the silane coupling agents are mercaptosilane base silane coupling agents, such as β-mercapto ethyltriethoxy silane and γ-mercapto propyltrimethoxy silane; and aminosilane base silane coupling agents, such as γ-aminopropyltrimethoxy silane and γ-aminopropyltriethoxy silane. Preferable among them are the mercaptosilane base silane coupling agents, and further preferable is the γ-mercapto propyltrimethoxy silane.

Preferably, the polyisocyanate is allowed to react with the silane coupling agent with the equivalent ratio of 0.010–0.300 of the active hydrogen group of the silane coupling agent per 1.00 of the isocyanate group in the polyisocyanate. With the equivalent ratio of less than 0.010 of the active hydrogen group of the silane coupling agent per 1.00 of the isocyanate group, insufficient adhesion of an adherend by means of the silane coupling agent may occur to lower water resistance. On the other hand, with the equivalent ratio of more than 0.300 of the active hydrogen group of the silane coupling agent per 1.00 of the isocyanate group, concentration of a free isocyanate group may decrease excessively to cause deterioration of the properties including durability in adhesion properties.

The modified polyisocyanate (a) can be obtained by mixing the components of polyisocyanate, emulsifying agent and silane coupling agent in the above-mentioned reacting proportions and stirring the mixture for about 1 hour to about 8 hours at about 50° C. to about 90° C. to be allowed to react. It is preferable that the content of the free isocyanate group in the modified polyisocyanate (a) thus obtained is in the range of 11.5 to 21.5% by weight. With the content of less than 11.5%, the concentration of free isocyanate group may decrease excessively to cause deterioration of the properties including durability in adhesion properties. On the other hand, with the content of more than 21.5%, a pot life after the mixture with the core shell emulsion (b) may be shortened.

To obtain the modified polyisocyanate (a) of a desired free isocyanate group content, a sampling of the reactant from a reaction system can be made with time in the course of the abovesaid reaction, to determine the isocyanate group content by an amine equivalent weight method so that the reaction can be concluded when the isocyanate group content reaches a predetermined content. Preferably, the components are mixed in advance in such proportions that when reaction of the emulsifying agent and the silane coupling agent with the polyisocyanate is quantitatively concluded, the content of the free isocyanate group in the modified polyisocyanate (a) obtained can be in the range of 11.5 to 21.5%, and threafter the mixed components are allowed to react until their reaction is completely concluded.

Further, it is preferable that the modified polyisocyanate (a) obtained has a viscosity of 100 to 10,000 mPa·s (at 23° C.).

A core shell emulsion (b) of the present invention is an emulsion of a core shell polymer having a core layer of a rubbery polymer and a shell layer of a glassy polymer, and the core layer and/or the shell layer have an active hydrogen group reactable to an isocyanate group.

The core shell emulsion, which may include those obtained by various kinds of synthesizing methods, can be usually obtained by a consecutive multistage emulsion polymerization method by which a polymer in an earlier stage is sequentially covered with a polymer in the next stage, among seed emulsion polymerization methods. It is preferable that when particles are generated in the polymerization, monomers, surface-active agents and water are added into the reaction system and then polymerization initiators are added thereto, for allowing emulsion polymerization reaction to start.

The polymerization in the core layer is a reaction for forming the rubbery polymer. The monomers capable of forming the rubbery polymer include, for example, conjugated diene or alkyl acrylate having 2–8 carbons in the alkyl group or the mixture thereof. The conjugated dienes include, for example, butadiene, isoprene and chloroprene. The alkyl acrylates having 2–8 carbons in the alkyl group include, for example, ethyl acrylate, propyl acrylate, butyl acrylate, cyclohexyl acrylate, 2-ethylhexyl acrylate and isononyl acrylate. Preferable among them may be butyl acrylate.

For polymerization of the core layer, monomers copolymerizable with the alkylacrylate, e.g. aromatic vinyls or aromatic vinylidenes including styrene, vinyltoluene and α-methylstyrene; vinyl cyanides or vinylidene cyanides including acrylonitrile and methacrylonitrile; and alkyl methacrylates including methyl methacrylate and butyl methacrylate may also be copolymerized. Further, crosslinkable monomers including alkane polyol polyacrylates or alkane polyol polymethacrylates, such as ethylene glycol diacrylate, ethylene glycol dimethacrylate, butylene glycol diacrylate, hexanediol diacrylate, hexanediol dimethacrylate, oligoethylene glycol diacrylate, oligoethylene glycol dimethacrylate, trimethylolpropane triacrylate and trimethylolpropane trimethacrylate, and unsaturated carboxic acid allyl esters, such as allyl acrylate, allyl methacrylate, diallyl maleate, diallyl fumarate and diallyl itaconate, may be copolymerized.

Further, when the active hydrogen group reactable to the isocyanate group is introduced into the core layer, monomers having the active hydrogen group reactable to the isocyanate group are copolymerized together with the monomers capable of forming the rubbery polymer. The active hydrogen groups reactable to the isocyanate groups include, for example, a carboxyl group, a hydroxyl group and an amino group, and preferable among them is the hydroxyl group. The monomers having the active hydrogen group reactable to the isocyanate group include acrylic acid, methacrylic acid, 2-hydroxyethyl acrylate, 2-hydroxyethyl methacrylate, polyethylene glycol acrylate, polyethylene glycol methacrylate, polypropylene glycol acrylate, polypropylene glycol methacrylate, N-methylol acrylamide, N-methylol methacrylamide, N-methylamino ethyl acrylate, N-methylamino ethyl methacrylate, N-tert-butylamino ethyl acrylate, N-tert-butylamino ethyl methacrylate, 2-hydroxypropyl acrylate and 2-hydroxypropyl methacrylate. Preferable among them are 2-hydroxyethyl methacrylate and 2-hydroxypropyl methacrylate.

These monomers are polymerized to form the rubbery polymer. Preferably, the glass transition temperature (Tg) of the rubbery polymer is not more than 20° C. With the glass transition temperature Tg exceeding 20° C., sufficient adhesive strength may not be obtained in some instances.

When two or more kinds of monomers are employed together, the Tg of the copolymerizate can be roughly determined from the following equation (1).

$$1/Tgc = W_1/Tg_1 + W_2/Tg_2 + W_3/Tg_3 + \quad (1)$$

Here, $W_1$ represents a weight fraction of monomer 1 in the copolymer;

$W_2$ represents a weight fraction of monomer 2 in the copolymer;

$W_3$ represents a weight fraction of monomer 3 in the copolymer;

Tgc is Tg expressed by absolute temperature (°K) of the copolymer;

$Tg_1$ is Tg expressed by absolute temperature (°K) of homopolymer of the monomer 1;

$Tg_2$ is Tg expressed by absolute temperature (°K) of homopolymer of the monomer 2; and $Tg_3$ is Tg expressed by absolute temperature (°K) of homopolymer of the monomer 3.

Known values of prior art documents, e.g. polyacrylic acid ethyl ester 249 (°K), polyacrylic acid butyl ester 233 (°K), polyacrylic acid 2-ethylhexyl ester 213 (°K), polystyrene 378 (°K), polyvinyltoluene 409 (°K), poly α-methylstyrene 441 (°K), polymethyl methacrylate 403 (°K), polyacrylic acid 379 (°K), polymethacrylic acid 501 (°K), poly 2-hydroxyethyl methacrylate 328 (°K), are available for the homopolymer Tg. However, since there are no available known values for Tg of the homopolymer of the allyl methacrylate and also the crosslinked structure or the Tg depends on reaction conditions, calculations are made assuming the Tg to be 373 (°K), for convenience's sake.

The polymerization of the shell layer is a reaction for forming glassy polymer. The monomers capable of forming the glassy polymer include, for example, (i) vinyl polymerizable monomers including alkyl acrylates or alkyl methacrylates, such as methyl acrylate, methyl methacrylate, ethyl acrylate, ethyl methacrylate, butyl acrylate and butyl methacrylate; aromatic vinyls or aromatic vinylidenes, such as styrene, vinyltoluene and α-methylstyrene; and vinyl cyanides or vinylidene cyanides, such as acrylonitrile and methacrylonitrile, (ii) alkanpolyol polyacrylates or alkane polyol polymethacrylates including ethylene glycol diacrylate, ethylene glycol dimethacrylate, butylene glycol diacrylate, hexanediol diacrylate, hexanediol dimethacrylate, oligoethylene glycol diacrylate, oligoethylene glycol dimethacrylate, trimethylolpropane triacrylate and trimethylolpropane trimethacrylate and (iii) unsaturated carboxic acid allyl esters including allyl acrylate, allyl methacrylate, diallyl maleate, diallyl fumarate and diallyl itaconate. Preferable among them are methyl methacrylate and styrene.

Further, when the active hydrogen group reactable to the isocyanate group is introduced into the shell layer, monomers having the active hydrogen group reactable to the isocyanate group are copolymerized together with the above-mentioned monomers capable of forming the glassy polymer. The active hydrogen groups reactable to the isocyanate groups include, for example, a carboxyl group, a hydroxyl group and an amino group, and preferable among them is the hydroxyl group. The monomers having the active hydrogen group reactable to the isocyanate group include acrylic acid, methacrylic acid, 2-hydroxyethyl acrylate, 2-hydroxyethyl methacrylate, polyethylene glycol acrylate, polyethylene glycol methacrylate, polypropylene glycol acrylate, polypropylene glycol methacrylate, N-methylol acrylamide, N-methylol methacrylamide, N-methylamino ethyl acrylate, N-methylamino ethyl methacrylate, N-tert-butylamino ethyl acrylate, N-tert-butylamino ethyl methacrylate, 2-hydroxypropyl acrylate and 2-hydroxypropyl methacrylate. Preferable among them are 2-hydroxyethyl methacrylate and 2-hydroxypropyl methacrylate.

These monomers are polymerized to form the glassy polymer. The reaction of the shell layer is performed by adding the monomers capable of forming the glassy polymer in the presence of the rubbery polymer particle emulsifying solution obtained by the above-mentioned reaction of the core. Preferably, the Tg of the glassy polymer is not less than 80° C. With the Tg lower than 80° C., reduction of water resistance may possibly occur. The Tg of the shell layer can be determined from the above equation (1).

The core shell emulsion (b) thus obtained has the active hydrogen group reactable to the isocyanate group in the core layer and/or the shell layer. It is preferable that the core shell emulsion has the active hydrogen group reactable to the isocyanate group in the core layer. With the core shell emulsion having no active hydrogen group reactable to the isocyanate group in the core layer, sufficient adhesive strength may not be obtained in some instances.

Preferably, the active hydrogen group reactable to the isocyanate group contained in the obtained core shell emulsion is contained in such a range that when the hydroxyl group is employed as the active hydrogen group reactable to the isocyanate group, for example, the hydroxyl value of a solid content of the core shell emulsion is in the range of between approximately 20 and approximately 110 (mgKOH/g). Desirably, a weight ratio of the rubbery polymer in the core layer to the glassy polymer in the shell layer is in the range between 20/80 and 90/10. Further, there is no specific limitation on a particle diameter of the obtained core shell emulsion, which is usually 50–1,000 nm, preferably, 100–700 nm.

In the production of the core shell emulsion (b), almost all widely-employed surface active agents including anionic surface active agents including sodium dodecyl benzenesulfonate, sodium lauryl sulfate and sodium dioctylsulfosuccinate, and nonionic surface active agents including polyoxyethylene nonylphenyl ether and polyoxyethylene monostearate, may be employed. In addition, organic and inorganic or oil-soluble and water-soluble polymerization initiators including, for example, azobisisobutyronitrile, benzoil peroxide, t-butyl hydroperoxide, cumene hydroperoxide, hydrogen peroxide, sodium persulfate and ammonium persulfate may be employed.

To modify molecular weights of the polymers, molecular weight modifiers including, for example, n-octyl mercaptan, n-dodecyl mercaptan, t-dodecyl mercaptan, thioglycolic acid and 2-ethylhexyl thioglycolate, may also be employed in the polymerization.

The modified polyisocyanate (a) and the core shell emulsion (b) thus obtained are mixed with the equivalent ratio (isocyanate group/active hydrogen group) of the isocianate group of the modified polyisocyanate (a) of 0.2–5, preferably 0.5–2.5, further preferably 1.0–2.0, per active hydrogen group of the core shell emulsion (b), to obtain the primer composition of the present invention.

With the primer composition of the present invention, 0.1–400 parts by weight of water per 100 parts by weight of the mixture of the modified polyisocyanate (a) and the core shell emulsion (b) may be mixed according to its objects and uses. Further, known additives including silane coupling agents having no active hydrogen group reactable to the isocyanate; colorants; age resistors; plasticizing agents; and tackifiers may be mixed as required.

The primer composition of the present invention thus obtained has an application life of the order of 8 hours so that it can be adequately employed in primer operations throughout the day, despite of its being a two-component system primer comprising the modified polyisocyanate (a) and the core shell emulsion (b). In addition, the primer composition of the present invention may be applied to an adherend surface by a common means e.g. spraying, brushing and the like, when applied to joints of building constructions and the like.

The primer composition of the present invention, which is an aqueous primer requiring no organic solvent, is superior to conventional organic solvent base primers in terms of global environment, safety, hygiene and the like, while also can improve adhesive strength of an adhesive and an adherend and adhesive durability as well as or better than the conventional organic solvent-based primers.

Besides, despite of its being a two-component system primer comprising the modified polyisocyanate (a) and the core shell emulsion (b), the primer composition of the present invention has such a long application life that it can be adequately employed in primer operations over a long time.

EXAMPLES

Next, the present invention will be more clearly understood with reference to the following examples. It is to be noted that the number of parts and percent (%) used herein represent parts by weight and percent (%) by weight, respectively, unless otherwise specified.

(Synthesis of Modified Polyisocyanate A)

In a four neck flask equipped with a stirrer, a thermometer and a reflux condenser tube thereto, 100 parts of an isocyanurate group containing polyisocyanate containing an isocyanurate group using HDI as its base (TAKENATE D-170 HN (Trade name) available from Takeda Chemical Industries, Ltd.) was weighed, to which 12 parts of polyoxyethylene nonylphenyl ether (EMULGEN 920 (Trade name) available from Kao Corporation) and 3 parts of γ-mercapto propyltrimethoxy silane (Y-11167 (Trade name) available from Nippon Unicar Company Limited) were added with stirring at 70° C. Then, the mixture was heated at 80° C. and stirred for 3 hours. After cooling to room temperature, substantially colorless, transparent, modified polyisocyanate A was obtained. The isocyanate group content of the modified polyisocyanate A was 18.6% and the viscosity thereof was 900 mPa·s (at 23° C.).

(Synthesis of Modified Polyisocyanate B)

Except that 9 parts of polyoxyethylene nonylphenyl ether and 3 parts of polyoxyethylene monomethyl ether (UNIOX M-550 (Trade name) available from NOF Corporation) were substituted for 12 parts of polyoxyethylene nonylphenyl ether in the synthesis of the modified polyisocyanate A, the same operations were performed to obtained the modified polyisocyanate B. The isocyanate group content of the modified polyisocyanate B was 18.5% and the viscosity thereof was 860 mPa·s (at 23° C).

(Synthesis of Modified Polyisocyanate C)

Except that γ-mercapto propyltrimethoxy silane was changed from 3 parts to 27 parts in the synthesis of the modified polyisocyanate A, the same operations were performed to obtained the modified polyisocyanate C. The isocyanate group content of the modified polyisocyanate C was 11.6% and the viscosity thereof was 2,000 mPa·s (at 23° C).

(Synthesis of Modified Polyisocyanate D)

Except that no γ-mercapto propyltrimethoxy silane was used in the synthesis of the modified polyisocyanate A, the same operations were performed to obtained the modified polyisocyanate D. The isocyanate group content of the modified polyisocyanate D was 19.7% and the viscosity thereof was 540 mPa·s (at 23° C.).

(Synthesis of Modified Polyisocyanate E)

Except that no γ-mercapto propyltrimethoxy silane was used in the synthesis of the modified polyisocyanate B, the same operations were performed to obtained the modified polyisocyanate E. The isocyanate group content of the modified polyisocyanate E was 19.6% and the viscosity thereof was 490 mPa·s (at 23° C.).

(Synthesis of Modified Polyisocyanate F)

Except that γ-glycidoxy propyltrimethoxy silane (KBM403 (Trade name) available from Shin-Etsu Chemical Co., Ltd) having no active hydrogen group reactable to the isocyanate group was substituted for γ-mercapto propyltrimethoxy silane in the synthesis of the modified polyisocyanate A, the same operations were performed to obtained the modified polyisocyanate F. The isocyanate group content of the modified polyisocyanate F was 19.2% and the viscosity thereof was 450 mPa·s (at 23° C.).

(Production of Core Shell Emulsion a)

In the following examples and comparative examples, abbreviations are used for the following terms:

Ethyl acrylate . . . EA n-butyl acrylate . . . BA

Methyl methacrylate . . . MMA

Styrene . . . St 2-hydroxyethyl methacrylate . . . HEMA

Allyl methacrylate . . . ALMA t-dodecyl mercaptan . . . t-DMP

Sodium dioctylsulfosuccinate (NEOCOL P (Trade name) available from Dai-Ichi Kogyo Seiyaku Co., Ltd) . . . NP Deionized water . . . DIW Sodium persulfate . . . SPS 75.00 parts of DIW, 10.00 parts of an 1% aqueous NP solution and 5.00 parts of an 1% aqueous sodium bicarbonate solution were charged into a polymerization container with a reflux condenser and were stirred in a stream of nitrogen while the temperature was elevated to 70° C. After 5 parts of BA were added and dispersed, 5.00 parts of a 2% aqueous SPS solution was added to initiate the seed polymerization. After stirring at 70° C. for 30 minutes, 8.00 parts of the 2% aqueous SPS solution was added and then monomer emulsion for the core layer comprising the following composition was fed for 180 minutes.

| Monomer Emulsion For Core Layer | |
|---|---|
| BA | 56.25 parts |
| HEMA | 18.68 parts |
| t-DMP | 0.08 parts |
| 1% aqueous NP solution | 48.00 parts |
| 1% aqueous sodium bicarbonate solution | 8.00 parts |
| DIW | 8.00 parts |

After having been stirred at 80° C. for 90 minutes, the mixture was cooled to 70° C. Then, 2.00 parts of 2% aqueous SPS solution was added and then monomer emulsion for the shell layer comprising the following composition was fed for 60 minutes.

| Monomer Emulsion For Shell Layer | |
|---|---|
| MMA | 18.00 parts |
| EA | 1.60 parts |
| ALMA | 0.40 parts |
| 1% aqueous NP solution | 12.00 parts |
| 1% aqueous sodium bicarbonate solution | 2.00 parts |
| DIW | 6.00 parts |

After having been stirred at 80° C. for 90 minutes, the mixture was cooled to room temperature to obtain the core shell emulsion a with a solid content of 35.0% and a hydroxyl value of a solid content of 79.6 (mgKOH/g). A calculated value of Tg of the resin in the core layer is approximately −22° C. and that in the shell layer is approximately 110° C.

(Production of Core Shell Emulsion b)

Except that the composition of the monomer emulsion for the core layer was changed as follows in the production of the core shell emulsion a, the same operations were performed to obtain the core shell emulsion b with a solid content of 35.0% and a hydroxyl value of a solid content of 79.6 (mgKOH/g). A calculated value of Tg of the resin in the core layer is approximately −6° C. and that in the shell layer is approximately 110° C.

| | |
|---|---|
| BA | 45.00 parts |
| St | 11.25 parts |
| HEMA | 18.68 parts |
| t-DMP | 0.08 parts |
| 1% aqueous NP solution | 48.00 parts |
| 1% aqueous sodium bicarbonate solution | 8.00 parts |
| DIW | 8.00 parts |

(Production of Core Shell Emulsion c)

(Production of Core Shell Emulsion c)

No reaction of the shell layer was performed in the production of the core shell emulsion a to obtain the core shell emulsion c with a solid content of 33.3% and a hydroxyl value of a solid content of 99.4 (mgKOH/g). A calculated value of Tg of the resin is approximately −22° C.

(Production of Core Shell Emulsion d)

Except that the composition of the monomer emulsion in the shell layer was changed as follows in the production of the core shell emulsion a, the same operations were performed to obtain the core shell emulsion d with a solid content of 35.0% and a hydroxyl value of a solid content of 79.6 (mgKOH/g). A calculated value of Tg of the resin in the core layer is approximately −22° C. and that in the shell layer is approximately 70° C.

| | |
|---|---|
| MMA | 14.00 parts |
| EA | 5.60 parts |
| ALMA | 0.40 parts |
| 1% aqueous NP solution | 12.00 parts |
| 1% aqueous sodium bicarbonate solution | 2.00 parts |
| DIW | 6.00 parts |

(Production of Core Shell Emulsion e)

(Production of Core Shell Emulsion e)

Except that the composition of the monomer emulsion for the core layer, the composition of the monomer emulsion for the shell layer and the addition of 2% aqueous SPS solution were changed as follows in the production of the core shell emulsion a, the same operations were performed to obtain the core shell emulsion e having hydroxyl group in the shell layer only with a solid content of 35.0% and a hydroxyl value of a solid content of 79.6 (mgKOH/g). A calculated value of Tg of the resin in the core layer is approximately −40° C. and that in the shell layer is approximately 98° C.

| Monomer Emulsion For Core Layer | |
|---|---|
| BA | 24.98 parts |
| t-DMP | 0.03 parts |
| 1% aqueous NP solution | 18.00 parts |
| 1% aqueous sodium bicarbonate solution | 3.00 parts |
| DIW | 3.00 parts |
| Monomer Emulsion For Shell Layer | |
| MMA | 47.12 parts |
| EA | 2.80 parts |
| HEMA | 18.68 parts |
| ALMA | 1.40 parts |
| 1% aqueous NP solution | 42.00 parts |
| 1% aqueous sodium bicarbonate solution | 7.00 parts |
| DIW | 11.00 parts |
| 2% aqueous SPS solution for core layer | 3.00 parts |
| 1% aqueous SPS solution for shell layer | 7.00 parts |

(Production of Core Shell Emulsion f)

(Production of Core Shell Emulsion f)

Except that the composition of the monomer emulsion for the core layer was changed as follows in the production of the core shell emulsion a, the same operations were performed to obtain the core shell emulsion f with a solid content of 35.0% and a hydroxyl value of a solid content of 79.6 (mgKOH/g). A calculated value of Tg of the resin in the core layer is approximately 25° C. and that in the shell layer is approximately 110° C.

| | |
|---|---|
| BA | 27.75 parts |
| St | 28.50 parts |
| HEMA | 18.68 parts |
| t-DMP | 0.08 parts |
| 1% aqueous NP solution | 48.00 parts |
| 1% aqueous sodium bicarbonate solution | 8.00 parts |
| DIW | 8.00 parts |

Example 1

56 parts of DIW was added to 100 parts of the core shell emulsion a with stirring, and 17 parts of the modified polyisocyanate A was added to the obtained mixture with mixing, to obtain a primer composition of the present invention. The equivalent ratio of the isocyanate group relative to the hydroxyl group (isocyanate group/hydroxyl group) is 1.5.

Example 2

56 parts of DIW was added to 100 parts of the core shell emulsion a with stirring, and 17 parts of the modified polyisocyanate B was added to the obtained mixture with mixing, to obtain a primer composition of the present invention. The equivalent ratio of the isocyanate group relative to the hydroxyl group (isocyanate group/hydroxyl group) is 1.5.

Example 3

Except that the core shell emulsion b was substituted for the core shell emulsion a, the same operations as those in Example 1 were performed to obtain a primer composition of the present invention. The equivalent ratio of the isocyanate group relative to the hydroxyl group (isocyanate group/hydroxyl group) is 1.5.

Example 4

Except that the core shell emulsion b was substituted for the core shell emulsion a, the same operations as those in Example 2 were performed to obtain a primer composition of the present invention. The equivalent ratio of the isocyanate group relative to the hydroxyl group (isocyanate group/hydroxyl group) is 1.5.

Example 5

81 parts of DIW was added to 100 parts of the core shell emulsion a with stirring, and 28 parts of the modified polyisocyanate C was added to the obtained mixture with mixing, to obtain a primer composition of the present invention. The equivalent ratio of the isocyanate group relative to the hydroxyl group (isocyanate group/hydroxyl group) is 1.5.

Example 6

Except that the modified polyisocyanate A was changed from 17 parts to 12 parts and the DIW was changed from 56 parts to 45 parts, the same operations as those in Example 1 were performed to obtain a primer composition of the present invention. The equivalent ratio of the isocyanate group relative to the hydroxyl group (isocyanate group/hydroxyl group) is 1.1.

Example 7

Except that the modified polyisocyanate A was changed from 17 parts to 22 parts and the DIW was changed from 56 parts to 68 parts, the same operations as those in Example 3 were performed to obtain a primer composition of the present invention. The equivalent ratio of the isocyanate group relative to the hydroxyl group (isocyanate group/hydroxyl group) is 2.0.

Example 8

Except that the core shell emulsion d was substituted for the core shell emulsion a, the same operations as those in Example 1 were performed to obtain a primer composition of the present invention. The equivalent ratio of the isocyanate group relative to the hydroxyl group (isocyanate group/hydroxyl group) is 1.5.

Example 9

Except that the core shell emulsion e was substituted for the core shell emulsion a, the same operations as those in Example 1 were performed to obtain a primer composition of the present invention. The equivalent ratio of the isocyanate group relative to the hydroxyl group (isocyanate group/hydroxyl group) is 1.5.

Example 10

Except that the core shell emulsion f was substituted for the core shell emulsion a, the same operations as those in Example 1 were performed to obtain a primer composition of the present invention. The equivalent ratio of the isocyanate group relative to the hydroxyl group (isocyanate group/hydroxyl group) is 1.5.

Comparative Example 1

54 parts of DIW was added to 100 parts of the core shell emulsion a with stirring, and 16 parts of the modified polyisocyanate D was added to the obtained mixture with mixing, to obtain a primer composition. The equivalent ratio of the isocyanate group relative to the hydroxyl group (isocyanate group/hydroxyl group) is 1.5.

Comparative Example 2

Except that the modified polyisocyanate E was substituted for the modified polyisocyanate D, the same operations as those in Comparative Example 1 were performed to obtain a primer composition. The equivalent ratio of the isocyanate group relative to the hydroxyl group (isocyanate group/hydroxyl group) is 1.5.

Comparative Example 3

Except that the modified polyisocyanate F was substituted for the modified polyisocyanate D, the same operations as those in Comparative Example 1 were performed to obtain a primer composition. The equivalent ratio of the isocyanate group relative to the hydroxyl group (isocyanate group/hydroxyl group) is 1.5.

Comparative Example 4

58 parts of DIW was added to 100 parts of the core shell emulsion c with stirring, and 20 parts of the modified polyisocyanate A was added to the obtained mixture with mixing, to obtain a primer composition. The equivalent ratio of the isocyanate group relative to the hydroxyl group (isocyanate group/hydroxyl group) is 1.5.

(Evaluation of the Primer Compositions)

The primer compositions in Examples and Comparative Examples thus obtained were evaluated by measuring the sealant for building constructions applied to Examples and Comparative Examples on their adhesive strengths immediately after initial cure and after immersion in hot water. The tests were performed in the following way, using mortar boards, siding boards (MOENSIDING W (Trade name) available from Nichiha Co, Ltd) and ALC boards (POWER BOARD (Trade name) available from Asahi Chemical Construction Materials Co., Ltd.) as the adherend and using a modified silicone base one-component type sealant and a polyurethane base one-component type sealant as the sealant for building constructions.

(1) Adhesive Bonding of Adherent with Modified Silicone Base One-Component Type Sealant The primer compositions obtained in the above-mentioned Examples and Comparative Examples were brushed double on surfaces of mortar boards and siding boards conformable with JIS (Japanese Industrial Standard) R5201. After air-drying for 1 hour, the boards were filled with the modified silicone base one-component type sealant in conformation with JIS A5758 and were subjected to an initial cure. The adhesive members thus produced were used as test pieces for tensile adhesive strength. The initial cure was performed under the conditions of at 25° C. and for 14 days.

(2) Adhesive Bonding of Adherent with Polyurethane Base One-component Type Sealant The primer compositions obtained in Examples 1–4 were brushed double on surfaces of ALC boards conformable with JIS R5201. After air-drying for 1 hour, the boards were filled with the polyurethane base one-component type sealant in conformation with JIS A5758 and were subjected to an initial cure. The bonding members thus produced were used as test pieces for tensile adhesive strength. The initial cure was performed under the conditions of at 25° C. and for 28 days.

Adhesive Strength and Adhesive Durability (Water resistance) Tests

The test pieces were measured on their adhesive strength (kgf/cm$^2$) and elongation (%) immediately after initial cure and after immersion in hot water of 50° C. for 7 days, respectively. The test results are shown in TABLES 1 and 2, along with test results obtained when commercially available organic solvent base primer compositions (polyisocyanate base) were applied, for reference purposes.

TABLE 1

| Example | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Modified Polyisocyanate | | | A | B | A | B | C | A | A | A |
| Emulsion | | | a | a | b | b | a | a | b | d |
| Equivalence Ratio (NCO group/OH group) | | | 1.5 | 1.5 | 1.5 | 1.5 | 1.5 | 1.1 | 2.0 | 1.5 |
| Adhesive (1) Adherent: Mortar Board | Immediatety After Cure | Strength (kgf/cm$^2$) Elongation (%) | 4.1 745 | 4.0 727 | 4.0 703 | 3.8 683 | 4.0 663 | 3.9 665 | 3.7 643 | 3.4 387 |
| Sealant Modified Silicone Base Sealant | After Immersion In Hot Water | Strength (kgf/cm$^2$) Elongation (%) | 2.5 605 | 2.5 593 | 2.4 580 | 2.4 578 | 2.5 574 | 2.4 580 | 2.3 558 | 1.2 355 |
| Adhesive (1) Adherent: Siding Board | Immediatety After Cure | Strength (kgf/cm$^2$) Elongation (%) | 5.1 592 | 5.2 612 | 5.0 567 | 4.9 545 | 4.8 561 | 4.9 533 | 4.7 519 | 3.7 344 |
| Sealant Modified Silicone Base Sealant | After immersion In Hot Water | Strength (kg/cm$^2$) Elongation (%) | 2.0 661 | 2.1 680 | 2.2 659 | 2.0 624 | 2.1 685 | 2.0 631 | 1.9 608 | 1.6 420 |
| Adhesive (2) Adherent: ALC Board | Immediatety After Cure | Strength (kgf/cm$^2$) Elongation (%) | 4.9 569 | 5.7 678 | 4.5 607 | 4.6 640 | — — | — — | — — | — — |
| Sealant: Urethane Base Sealant | After Immersion ln Hot Water | Strength (kgf/cm$^2$) Elongation (%) | 2.5 458 | 2.7 521 | 2.0 541 | 2.1 546 | — — | — — | — — | — — |

TABLE 2

| Example, Comparative Example and Reference Example | | | Ex. 9 | Ex. 10 | Com. Ex. 1 | Com. Ex. 2 | Com. Ex. 3 | Com. Ex. 4 | Reference Example | |
|---|---|---|---|---|---|---|---|---|---|---|
| Modified Polyisocyanate | | | A | A | D | E | F | A | Organic | solvent |
| Emulsion | | | e | f | a | a | a | c | base | primer |
| Equivalence Ratio (NCO group/OH group) | | | 1.5 | 1.5 | 1.5 | 1.5 | 1.5 | 1.5 | compositions (polyisocyanate base) | |
| Adhesive (1) Adherent: Mortar Board | Immediately After Cure | Strength (kgf/cm$^2$) Elongation (%) | 4.1 551 | 3.3 366 | 4.1 588 | 4.0 594 | 4.0 570 | 2.9 279 | 3.8 537 | |
| Sealant: Modified Silicone Base Sealant | After Immersion In Hot Water | Strength (kgf/cm$^2$) Elongation (%) | 1.4 390 | 1.1 331 | 1.0 206 | 0.9 178 | 1.1 218 | 0.4 47 | 2.0 580 | |
| Adhesive (1) Adherent: Siding Board | Immediately After Cure | Strength (kgf/cm$^2$) Elongation (%) | 4.0 476 | 3.5 329 | 4.0 442 | 3.9 401 | 4.i 395 | 3.2 311 | 4.5 501 | |
| Sealant: Modified Silicone Base Sealant | After Immersion In Hot Water | Strength (kgf/cm$^2$) Elongation (%) | 1.6 424 | 1.4 402 | 0.9 165 | 0.8 131 | 0.4 28 | 0.7 122 | 1.7 554 | |
| Adhesive (2) Adherent: ALC Board | Immediately After Cure | Strength (kg/cm$^2$) Elongation (%) | — — | — | — | — | — | — | — | |
| Sealant: Urethane Base Sealant | After Immersion In Hot Water | Strength (kgf/cm$^2$) Elongation (%) | — — | — | — | — | — | — | — | |

It is understood from TABLES 1 and 2 that the primer compositions in Examples 1–10 have favorable adhesive properties immediately after the initial cure and after immersion in hot water, as compared with Comparative Examples 1–4.

Further, it is understood that Examples 1–7 each using the core shell emulsion which has the active hydrogen group in the core layer and in which Tg of the rubbery polymer of the core layer is not more than 20° C. and Tg of the glassy polymer layer of the shell layer is not less than 80° C. have favorable adhesive properties, as compared with Example 9 using the core shell polymer e having the active hydrogen group in the shell layer, Example 10 using the core shell polymer f in which the Tg of the rubbery polymer of the core layer is more than 20° C. and Example 8 using the core shell polymer d in which the Tg of the glassy polymer of the shell layer is less than 80° C.

What is claimed is:

1. A primer composition comprising:
   (a) a modified polyisocyanate obtained by reaction of polyisocyanate; an emulsifying agent having an active hydrogen group reactable to an isocyanate group; and a silane coupling agent having an active hydrogen group reactable to an isocyanate group; and
   (b) a core shell emulsion having a core layer of a rubbery polymer and a shell layer of a glassy polymer and having an active hydrogen group reactable to an isocyanate group in the core layer and/or the shell layer.

2. A primer composition according to claim 1, wherein the core shell emulsion (b) has the active hydrogen group in the core layer.

3. A primer composition according to claim 1, wherein a glass transition temperature (Tg) of the rubbery polymer of the core layer of the core shell emulsion (b) is not more than 20° C. and a glass transition temperature (Tg) of the glassy polymer of the shell layer of the core shell emulsion (b) is not less than 80° C.

4. A primer composition according to claim 1, wherein the polyisocyanate in the modified polyisocyanate (a) is an isocyanurate group containing polyisocyanate containing an isocyanurate group using 1,6-diisocyanato hexane as a base.

5. A primer composition according to claim 1, wherein the emulsifying agent in the modified polyisocyanate (a) is polyoxyethylene alkyl ether and/or polyoxyethylene alkylaryl ether.

6. A primer composition according to claim 1, wherein the silane coupling agent of the modified polyisocyanate (a) is a mercapto silane base silane coupling agent.

* * * * *